April 21, 1959 R. L. GUENTNER ET AL 2,883,545
X-RAY APPARATUS
Filed Nov. 23, 1954 2 Sheets-Sheet 1

April 21, 1959  R. L. GUENTNER ET AL  2,883,545
X-RAY APPARATUS

Filed Nov. 23, 1954  2 Sheets-Sheet 2

WITNESSES:
Leon M. Garman
R. G. Brodahl

INVENTORS
Robert L. Guentner &
Raymond K. Jenny.
BY
F. E. Browder
ATTORNEY

United States Patent Office 2,883,545
Patented Apr. 21, 1959

2,883,545

X-RAY APPARATUS

Robert L. Guentner, Baltimore, and Raymond K. Jenny, Glen Burnie, Md., assignors to Westinghouse Electric Corporation, East Pittsburgh, Pa., a corporation of Pennsylvania Application November 23, 1954, Serial No. 470,678

5 Claims. (Cl. 250—66)

This invention relates to X-ray spotfilm or film holder devices, and more particularly to the actuating mechanism for the film holder or film cassette of X-ray spotfilm devices.

It is an object of the present invention to provide an improved spotfilm or film cassette apparatus for the positioning of an X-ray film for exposures to X-rays in making X-ray photographs.

It is another object to provide an improved film holder apparatus for shifting the film successively to a number of predetermined exposure positions.

It is a further object of this invention to provide an improved power actuation member for film holder or film cassette apparatus wherein the mechanism is quiet and rapid in operation and is less complex and hence more maneuverable and less subject to faulty operation.

It is an additional object to provide an actuating mechanism which allows a relatively free running movement of the film holder or film cassette from a parked or inactive position to an active or exposure position.

It is a different object of this invention to provide an actuating mechanism wherein free running movement of the film holder or film cassette to the active or exposure position is allowed and power or motor driven movement to the inactive or parked position is allowed.

It is still another object to provide a selectively controllable film holder or film cassette moving mechanism wherein the control of the mechanism is simplified and the mechanism is easier to operate.

In accordance with the invention, a film holder or film cassette actuating mechanism is provided wherein a free running movement of the film holder is allowed between the initial parked position and the desired exposure position for the film, and a motor driven movement is provided for the film holder between the exposure position and the parked or inactive position of the film holder. A drive motor is provided which is coupled to the film holder through a unidirectional coupling device and a constant tension restraining coupling member, such that the film holder can be rapidly and quietly moved from the exposure position to the parked position by the operation of suitably provided control switches. In addition, a tension member, such as a spring or the like apparatus, is provided to move the film holder from the parked or inactive position to the desired exposure position. The latter movement of the film holder is free running in that the unidirectional device is operative to decouple the drive motor from the film holder during the movement of the film holder from the inactive or parked position to the active or exposure position. Further control of the film holder during the latter movement is provided by a constant tension restraining or negator apparatus which is coupled between the unidirectional clutch device and the film holder, such that a constant retarding force is imparted to the film holder in opposition to the force of the tension member employed. Additionally, control switches are provided, such that a single manually controlled switch having a first contact position and a second contact position is operative in said first contact position to release a film holder locking mechanism and allow the tension member to move the film holder from the inactive or parked position to the active or exposure position. The manually controlled switch in the second contact position is operative to energize the drive motor to move the film holder from the exposure or active position to the inactive or parked position through the unidirectional coupling member and the negator or constant force restraining member. An additional switch is provided to deenergize the drive motor when the film holder arrives in the parked or inactive position.

The foregoing and numerous other embodiments, advantages and inherent functions of the invention will become apparent as the same is more fully understood from the following description, which, when taken in connection with the accompanying drawings, discloses a preferred embodiment of the invention, and in which drawings.

Figs. 5, 6, 7 and 8 are circuit diagrams illustrating the operation of the operator's control switch and the film holder park switch to control the movement of the film holder actuating mechanism in accordance with the present invention, and Figs. 9, 10, 11 and 12 are modified circuit diagrams illustrating the operation of the operator's control switch and a modified form of the film holder park switch to control the movement of the film holder.

Figures 1, 2:
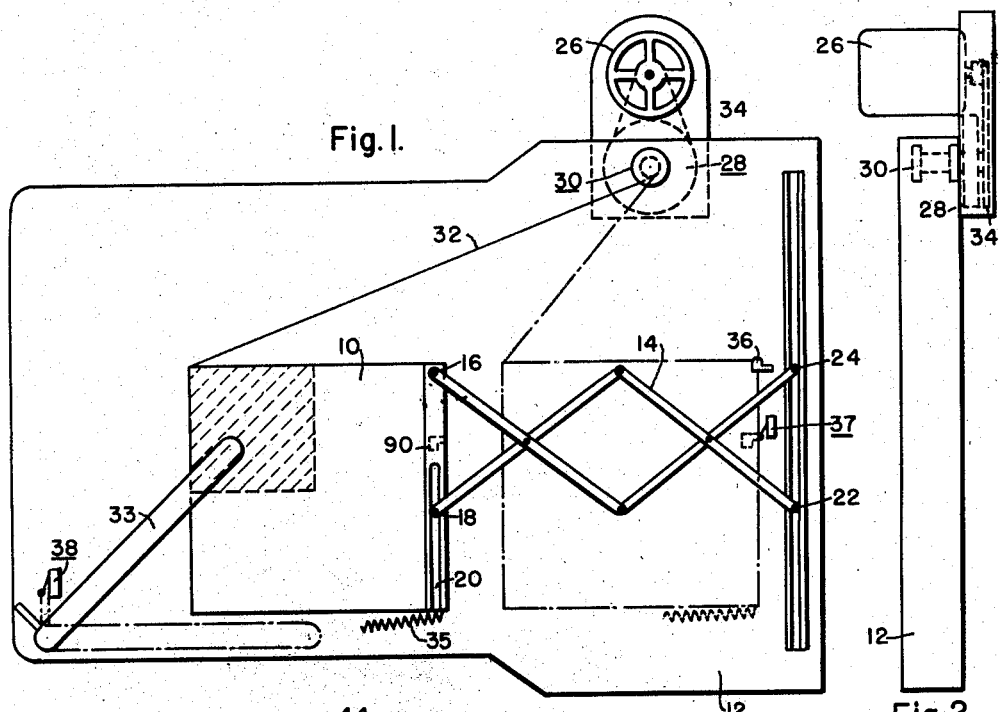
Figure 1 is a top view of film holder apparatus and the actuating mechanism therefor in accordance with the present invention.
Fig. 2 is a side view of the apparatus shown in Fig. 1.

In Fig. 1, there is shown a film holder 10 in the exposure or active position and a support for said film holder 10 including a base 12 and a pantograph extension mechanism 14, which is operative between a fixed pivot 16 on the film holder and a movable connection 18 which is movable in a provided slot 20 of the film holder. The pantograph mechanism is similarly operable between a first pivot position 22 and a second pivot position 24 on the base 12. The relative positions of the latter first pivot 22 and the second pivot 24 on the base 12 can be moved in a direction substantially perpendicular to the movement direction of the film holder by means of a suitable program drum and associated cams and links (not shown) which control the positioning of the film holder such that an operator has a number of choices as to how he will employ the X-ray film carried by the film holder or film cassette. In this respect, it is well known in the prior art how an operator, such as a physician or radiologist, by means of the programming drum and cooperative cams and links, can cause the film holder to be positioned such that four quadrants of the film can be employed to take a different picture on each quadrant, or he may divide the film in half such that a separate picture is taken in each half of the film, or he may decide to use the whole of the film for a single picture. One such quadrant of the film is shown crosshatched in Fig. 1. It is one function of the spotfilm actuating mechanism to place the film to be used for a particular picture such that the center of the desired portion of the film is properly positioned. The general operation of film holder apparatus or spotfilm apparatus in this respect is believed to be well known in the prior art.

A first power member or drive motor 26 is connected to the film holder 10 through a unidirectional coupling or clutch member 28 and a constant force restraining or negator member 30. The constant force retarding member 30 includes a spring member 32 in the form of a narrow strip which winds up like a roll of tape and has the characteristic that the restraining force of the apparatus is substantially constant for all positions. A connecting belt 34 is provided between the motor 26 and the clutch 28. A second power member or spring 35 is connected between the film holder 10 and the support base 12. A manually controlled operator's switch 38 operable by means of a suitable manual handle 33 is provided to control the movement of the film holder 10, and a park switch 37 is provided to energize a locking mechanism including a solenoid-operated locking or park latch 36. In this respect, the locking mechanism can be solenoid-releasable and self-locking to hold the film holder 10.

In Fig. 2, there is shown a side view of the apparatus shown in Fig. 1. The relative positions of the drive motor 26, the unidirectional clutch member 28, and the constant force restraining member 30 are clearly shown. The support base 12 is operative to support the above members.

Figure 3:
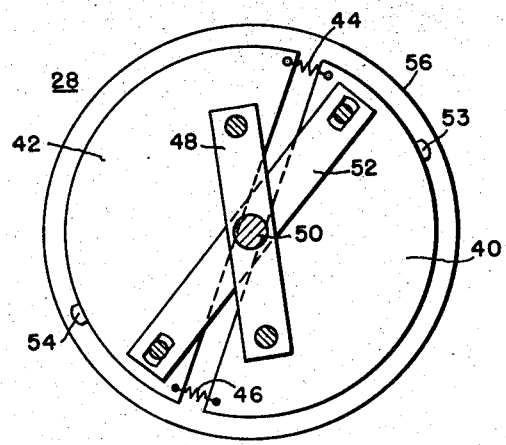
Fig. 3 is a sectional view of the unidirectional coupling or clutch member provided between the driving motor and the film holder.

In Fig. 3, there is shown one form of a suitable unidirectional coupling member or clutch 28 including a pair of weight members 40 and 42 which are connected together by springs 44 and 46 and by a coupling link 48 which is pivotally connected to each of the weights 40 and 42 and is rigidly connected to a central drive shaft 50. A synchronizing link 52 is pivotally connected between the weights 40 and 42 and is pivotally supported but loosely held by the shaft 50. On the weights 40 and 42 there are provided respective friction drive members 53 and 54 which are engageable with an outer shell 56.

The unidirectional coupling member 28, as shown in Fig. 3, provides a variable degree of coupling which depends upon, among other things, the angle between the coupling link 48 and an imaginary line drawn between the friction members 53 and 54 on the respective weights 40 and 42. The coupling link 48 is rigidly fixed to the shaft 50 and is operative as the drive member when rotated in a counterclockwise direction to move the weights 40 and 42. Other things remaining constant, a larger angle at this point increases the self-energizing characteristic of the unidirectional member 28 and increases the amount of force transmitted by the unidirectional member 28 between the motor 26 and the film holder 10. In this respect, an angle corresponding to the angle shown in Fig. 3 will allow the unidirectional device 28 to provide ample power transmission for normal movement of the film holder 10, but will allow a slippage between the drive shaft 50 and the shell 56 at a reasonably safe current should the film holder 10 become jammed while moving from the exposed position to the parked position. In the latter event, the operator has ample time, upon noting the jamming of the film holder 10, to move the switch arm 84 of the operator switch 38 into connection with the first contact 74 to deenergize the motor 26.

Figure 4A:
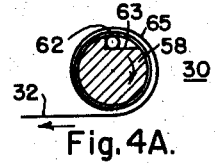
Figs. 4a and 4b are sectional views to illustrate respectively the operation of the constant force restraining coupling apparatus between the unidirectional clutch member and the film holder for respectively the movement of the film holder to the active or exposure position and the movement of the film holder to the inactive or parked position.
Figure 4B:
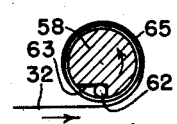

In Figs. 4a and 4b, there is shown a suitable form of the constant force tension or restraining member 30, including a central drive shaft 58 and a spring member 32, with said spring member 32 being fastened to the drive shaft 58 through a suitable coupling, such as roller member 62.

Figure 5:
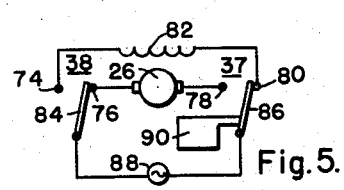

In Fig. 5, there is shown a first switch 38 and a second switch 37, with said first switch having a first contact 74 and a second contact 76, and the second switch having a first contact 78 and a second contact 80. A solenoid or relay control member 82 is connected between the first contact 74 of the first switch and the second contact 80 of the second switch. The drive motor 26 shown in Fig. 1 is connected between the second contact 76 of the first switch 38 and the first contact 78 of the second switch 37. A suitable source of power 88 is connected between the switch arm 84 of the first switch 38 and the switch arm 86 of the second switch 37. A switch arm operator 90 is provided for the switch arm 86 of the second switch 37, which switch arm operator 90 is fastened to the film holder 10 shown in Fig. 1. As shown in Fig. 5, the switch arm 86 is connected to the second contact 80 of the second switch 37 by virtue of the film holder 10 being in the inactive or parked position.

Figure 6:
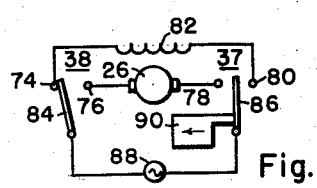
Figure 7:
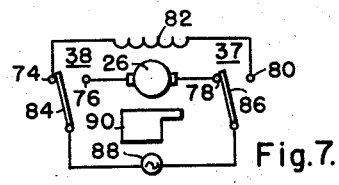
Figure 8:
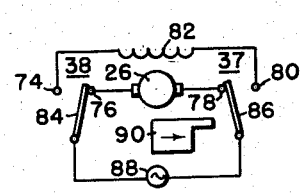
Figure 9:
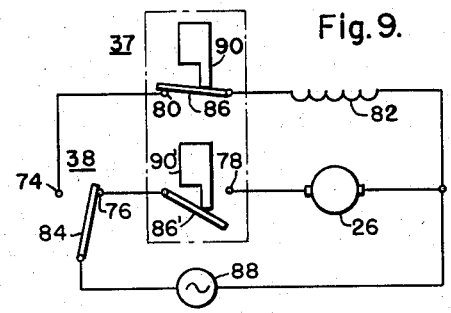
Figure 10:
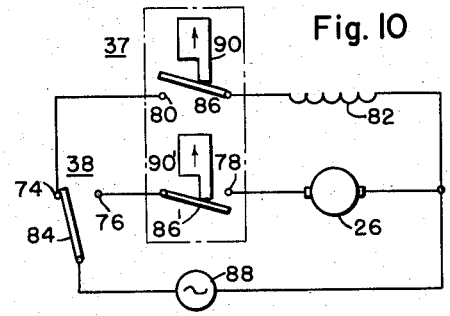
Figure 11:
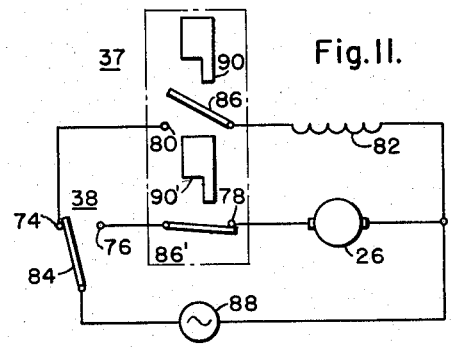
Figure 12:
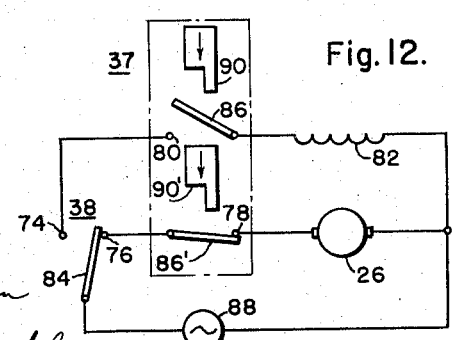

The schematic diagrams of Figs. 6, 7 and 8 correspond in general to the schematic diagram of Fig. 5. However, in Fig. 6, the switch arm 84 of the first switch 38 is connected to the first contact 74, and the switch arm 86 of the second switch 37 is positioned intermediate between the first contact 78 and the second contact 80 of the second switch 37, such that neither the solenoid control member 82 nor the motor 26 is energized from the power source 88. The position of the switch arm 86 can be seen to be controlled by the switch arm operator 90 which is fastened to the film holder 10 of Fig. 1.

The position of the switch arm operator 90, as shown in Fig. 6, would correspond to a position of the film holder 10 which is intermediate between the inactive or parked position and the active or exposure position of the film holder 10.

In Fig. 7, the schematic diagram illustrates the position of the switch arm 84 of the first switch 38 being in connection with the first contact 74, as manually determined by the operator when it is desired to move the film holder 10 from the parked position to the exposure position. Also in Fig. 7, the switch arm 86 is connected to the first contact 78 of the second switch 37 by virtue of the position of the switch arm actuator 90 corresponding to the film holder 10 being in the active or exposure position.

In Fig. 8, the schematic diagram shows the switch arm 84 of the first switch 38 being connected to the second contact 76 of the first switch 38, as manually determined by the operator and the switch arm 86 of the second switch 37 being connected to the first contact 78.

In the operation of the apparatus shown in Fig. 1, the switch arm 84 of the operator's switch 38 is manually positioned by the operator to be in connection with the second contact 76 to energize the motor 26 to move the film holder 10 from the active or exposure position (illustrated in Fig. 1) to the inactive or parked position shown by the dotted lines. This operation of switch arm 84 is shown in Fig. 8. In the inactive or parked position, the film holder 10 is locked or retained in position by means of a solenoid operated locking member or park latch 36.

Also, as shown in Fig. 5, the switch arm operator 90 is effective to move the switch arm 86 into contact with the second contact 80 when the film holder 10 is in the parked position. When it is desired that the film be exposed to X-rays for the taking of an X-ray picture, the switch arm 84 of the operator's switch 38 is manually moved to connection with the first contact 74 by the operator, as shown in Fig. 6. This energizes a control solenoid or relay 82 of the locking member 36 through the park switch 37 from a suitable power source 88 to release the locking member 36 and allow the pullout springs or spring drive member 35 to move the film holder 10 into the active or exposure position against the constant restraining force of the negator member 30, including the spring member 32. In the latter operation, only the negator member 30 provides a retarding force to the movement of the film holder 10 in that the unidirectional coupling member 28 effectively disengages the motor 26 from the negator member 30 and film holder 10.

When the film holder 10 reaches the active or exposure position, the switch arm 86 of the park switch 37, by a suitable biasing force such as a spring or like member (not shown), moves into connection with the first contact 78.

Upon the completion of the X-ray exposure to take the desired X-ray picture, the switch arm 84 of the operator switch 38 is manually moved to be connected to the second contact 76 by the operator to energize the motor 26 through the first contact 78 and switch arm 86 of the park switch 37 to move the film holder 10 from the active or exposure position to the inactive or parked position.

In the operation of the unidirectional coupling member or clutch 28, as shown in Fig. 3, the motor 26 through the connecting belt 34 is connected to the central drive shaft 50 through suitable pulleys or like connection members. The pair of weights 40 and 42 are centrifugally moved in a direction away from the central drive shaft 50, such that the friction members 52 and 54 come in contact with the outer shell 56. In this respect, the weights 40 and 42 are pivoted on pins of a double crank shaft arrangement, including the coupling link 48 and synchronizing link 52, said pivots being in the form of laterally fixed pivotal connections to the coupling link 48 and laterally variable pivot connections to the synchronizing link 52. The outer shell 56 of the unidirectional coupling member 28 is mechanically connected to the central shaft 58 of the constant force retarding member 30 shown in Figs. 4a and 4b.

In Fig. 4a, the shaft 58 is rotating in a clockwise direction corresponding to the movement of the film holder 10 from the inactive or parked position to the active or exposure position, and, hence, allows the connecting spring 32 to unwind from the shaft 58. In Fig. 4b, the drive shaft 58 is moving in a counterclockwise direction to wind up the connecting spring member 32 to correspond to a movement of the film holder 10 from the exposure position to the parked position. In this respect, the spring member 32 may be provided with a direct mechanical connection to the shaft 58, or may be provided with a friction connection as shown, including a cylindrical roller member 62 which rides in a tapered or wedge-shaped slot 63 in the shaft 58. A friction connection is preferable in that it allows a free running action of the spring member 32 when the film holder 10 terminates its movement from the parked position to the exposure position, and further when the shaft 58 rotates as shown in Fig. 4B, the roller member 62 is thrust outwardly along the slot 63 to provide a friction grip or band brake type of action to expand against the inner turns 65 of the spring member 32, which inner turns act substantially as a resilient sleeve around shaft 58, when the film holder 10 is to be moved from the exposure position to the parked position.

To further explain the operation of the constant tension retarding member 30 as illustrated in Fig. 4a and Fig. 4b during movement of the film holder 10 from the parked position to the exposure position, the drive shaft 58 rotates in a clockwise direction as shown in Fig. 4a, and the spring member 32 moves in the direction indicated by the arrow. When the film holder terminates its movement in the exposure position, the flywheel effect of the drive shaft 58 and the remaining turns of the spring member 32 around the drive shaft 58 may cause them to spin for a short time. This motion would snarl a conventional drive but does not affect the constant tension retarding member 30, in that the drive shaft 58 can turn inside the expansible coiled spring member 32 such that there is a tendency only to uncoil the inner turns of the spring member 32 a small amount such that the spring member 32 is still held straight and taut by its internal stress characteristic.

To further explain the operation of the unidirectional coupling member 28 to insure proper clutch action regardless of the position of the weights 40 and 42 relative to the central drive shaft 50, one end of each respective weight is pivotally connected to the synchronizing link 52, which link 52 is loosely pivoted about the central drive shaft 50 such that each of the respective weights 40 and 42 tend to balance each other and to equalize the pressure on the two friction buttons 53 and 54 to minimize vibration and the like which would occur as a result of any unequal net pressures between the respective friction members 53 and 54 and the outer shell 56. The connecting spring members 44 and 46 are provided to collapse the weight assembly and to thereby prevent any undesirable binding with the outer shell member 56 when the film holder 10 moves toward the exposure position and shaft 58 is allowed to spin as above described.

With reference to Figs. 5 through 8, the schematic diagram shown in Fig. 5 illustrates the positions of the switch arm 84 of the operator switch 38 and the switch arm 86 of the park switch 37 when the film holder 10 is in the parked position, and the operator does not desire to release the film holder 10 from the parked position. The schematic diagram shown in Fig. 6 illustrates the circuit connection after the operator switch 38 has been moved to energize the solenoid or relay member 82 to release the locking member 36 which holds the film holder 10 in the parked position. Upon energization of the solenoid member 82, the locking member 36 releases the film holder 10 which initiates the movement of the film holder 10 from its parked position to its exposure position by means of the drive springs 35. As shown in Fig. 6, the contact arm 86 of the park switch 37 is in its intermediate position, such that the solenoid member 82 is no longer energized.

In Fig. 7, the schematic diagram illustrates the circuit condition when the operator switch 38 is still in the position it had in Fig. 6, but the contact arm operator 90, which is fastened to the film holder 10, has allowed the contact arm 86 of the park switch 37 to be connected to the first contact 78 which is, in turn, connected to the motor 26.

In Fig. 8, there is illustrated the schematic diagram for the circuit condition when the operator desires to energize the motor 26 to return the film holder 10 from the exposure position to the parked position. In Fig. 8, the switch arm 84 of the operator switch 38 has been moved by the operator to be connected to the second contact 76, and the contact arm 86 of the park switch 37 is connected to the first contact 78 of the park switch 37. When the switches are in the position shown in Fig. 8, the motor 26 is energized to return the film holder 10 to the parked position. However, the contact arm operator 90, which is fastened to the film holder 10, is operative to open the motor circuit when the film holder 10 arrives in a parked position by moving the contact arm 86 of the park switch 37 to be connected to the second contact 80 of the park switch 37. After the latter operation, the circuit condition is again that illustrated by the schematic diagram of Fig. 5.

In Figs. 9 through 12, the circuits operate similarly in principle to the circuits of Figs. 5 through 8, however a modified park switch 37 has been employed including two separate switch arms 86 and 86' operated by the contact arm operators 90 and 90', which latter operators 90 and 90' are both fastened to the film holder 10. The modified form of circuits shown in Figs. 9 through 12 allow all of the switching to be done on one side of the power supply.

We have shown a mechanism which will automatically position a film holder in less than one second by spring action. The return or parking movement may be made slower, which allows a smaller size motor than prior art devices. It is desirable to use the smallest practical motor to reduce the physical dimensions and weight of the apparatus, since it is movably mounted above the surface of the X-ray table.

While we have shown our invention in particularly one form only, it will be obvious to those skilled in the art that it is not so limited but is susceptible of various changes and modifications without departing from the spirit thereof. For example, fastening member 62 of the constant force restraining member 30 may be made unidirectional in operation by providing a peripheral tapered slot or semi-spherical indentation in the central shaft 58 and a loose ball member in said slot, with the spring member 32 being fastened to an outer shell similar to the shell 56 of the clutch 28. This outer shell will then be cooperative with the ball member to provide a releasable coupling to allow the outer shell to rotate free of the shaft 58, when the shaft 58 is not used as the power or drive member.

We claim as our invention:

1. In X-ray apparatus including a film holder and a support for said film holder, said film holder being movable between a first position and a second position, the combination of a tension member connected between said support and said film holder for moving the film holder from said first position to said second position, and motor means including a unidirectional coupling member connected between said support and said film holder for moving the film holder from said second position to said first position.

2. In X-ray apparatus including a film holder and a support for said film holder, said film holder being movable between a park position and an exposure position, the combination of first power means connected between said support and said film holder for moving said film holder from said exposure position to said park position, and second power means including a stored energy device connected between said support and said film holder for moving said film holder from said park position to said exposure position, said first power means including a unidirectional clutch mechanism which is operative to disconnect said first power means from said film holder when the second power means is moving the film holder from said park position to said exposure position.

3. In X-ray apparatus including a film holder, said film holder being movable between a first position and a second position, first power means for moving said film holder from the first position to the second position, second power means for moving said film holder from the second position to the first position, locking means for locking the film holder in said first position, a first switch member having a first contact and a second contact, a second switch member having a third contact and a fourth contact, said first switch member being operable through said first contact and through the third contact of said second switch member to release said locking means such that said first power means becomes operable to move said film holder, and said first switch member being operable through the second contact and through the fourth contact of the second switch member to cause said second power means to move said film holder.

4. In an X-ray spot film device including a support member and a carriage mounted for movement between a first position and a second position, a tension member connected between said support member and said carriage for moving the carriage toward said second position, motor drive means mounted on said support means for moving said carriage from said second position toward said first position, a unidirectional coupling means connected to said motor drive means, and an elongated flexible connector member having one end attached to said carriage and the other end adapted to coil about and frictionally engage said unidirectional coupling means so that said coupling means is operative in response to said motor drive means to actuate said connector member for moving said carriage toward said first position.

5. A radiographic spot film device comprising a support frame, a cassette carriage mounted for movement on said frame between a parked position and an exposure position, motor drive means mounted in fixed position relative to said frame for moving said carriage toward said parked position, a unidirectional clutch device on said frame including a drive member coupled to said motor drive means so as to be actuated thereby and a driven member adapted to frictionally engage with said drive member when said motor drive means is energized, an elongated connector member having a pair of end portions with one end portion attached to said carriage and the other end portion frictionally engaging the periphery of said driven member so that said driven member is operative to apply a retraction force to said connector member when actuated by said motor drive means, and spring means connected between said support frame and said carriage for moving said carriage toward said exposure position, said unidirectional clutch device being operative to effectively disconnect said motor drive means and said connector member when said spring means is moving said carriage toward the exposure position.

References Cited in the file of this patent

UNITED STATES PATENTS

| | | |
|---|---|---|
| 2,327,603 | Kizaur | Aug. 24, 1943 |
| 2,709,221 | Haupt et al. | May 24, 1955 |